US012479528B1

(12) United States Patent
Holmquist

(10) Patent No.: US 12,479,528 B1
(45) Date of Patent: Nov. 25, 2025

(54) APPARATUSES AND METHODS FOR A TRAILER AND ELEVATING TRAILER BED

(71) Applicant: Stream Logistics LLC, Scottsdale, AZ (US)

(72) Inventor: Carson Holmquist, Scottsdale, AZ (US)

(73) Assignee: SAVAGE INDUSTRIAL, LLC, Scottsdale, AZ (US)

( * ) Notice: Subject to any disclaimer, the term of this patent is extended or adjusted under 35 U.S.C. 154(b) by 0 days.

(21) Appl. No.: 18/925,832

(22) Filed: Oct. 24, 2024

(51) Int. Cl.
*B62D 63/06* (2006.01)
*B62D 21/02* (2006.01)
*B62D 21/20* (2006.01)

(52) U.S. Cl.
CPC ........... *B62D 63/061* (2013.01); *B62D 21/02* (2013.01); *B62D 21/20* (2013.01)

(58) Field of Classification Search
CPC ....... B62D 63/061; B62D 21/02; B62D 21/20
See application file for complete search history.

(56) References Cited

U.S. PATENT DOCUMENTS

| 3,574,388 | A | * | 4/1971 | Stone | B60P 3/423 |
| | | | | | 280/43.23 |
| 3,737,061 | A | * | 6/1973 | Glumac | B60P 1/02 |
| | | | | | 414/498 |
| 4,050,707 | A | * | 9/1977 | Glumac | B60S 9/04 |
| | | | | | 280/43.23 |
| 4,318,658 | A | * | 3/1982 | McIntyre | B60P 3/07 |
| | | | | | 298/17 R |
| RE32,736 | E | | 8/1988 | Lovell | |
| 5,040,826 | A | * | 8/1991 | Lovell | B60S 9/20 |
| | | | | | 280/6.151 |
| 5,219,429 | A | * | 6/1993 | Shelton | B60S 9/12 |
| | | | | | 254/423 |

(Continued)

FOREIGN PATENT DOCUMENTS

| CN | 110962726 A | 4/2020 |
| CN | 214728427 | 11/2021 |

(Continued)

OTHER PUBLICATIONS

China Heavy Lift, 10 axle Extendable lowbed semi trailers with hydraulic-suspension knuckle-steering, https://www.chinaheavylift.com/10-axle-extendable-hydraulic-suspension-lowbed-trailer/, 5 pages, date:N/A.

(Continued)

*Primary Examiner* — Paul N Dickson
*Assistant Examiner* — Shams Dhanani
(74) *Attorney, Agent, or Firm* — Goodhue, Coleman & Owens, P.C.

(57) ABSTRACT

A trailer with elevating bed is disclosed. A bed elevation assembly has elevation actuators quadrilaterally disposed and attached to frame members of a bed assembly and a chassis assembly of the trailer. The chassis assembly includes an axle mount, an axle attached at the axle mount, wheels operably attached to opposing ends of the axle, and a towing tongue for towing the trailer. The quadrilaterally disposed elevation actuators stabilize the bed assembly during movement from a nested position to an elevated position and when the bed assembly is held in the elevated position.

20 Claims, 8 Drawing Sheets

(56) References Cited

U.S. PATENT DOCUMENTS

| | | | | |
|---|---|---|---|---|
| 5,246,241 A * | 9/1993 | Baver | B60P 1/6481 | 280/789 |
| 6,045,317 A * | 4/2000 | Boucher | B60P 1/025 | 187/253 |
| 6,068,276 A * | 5/2000 | Kallstrom | B62D 21/20 | 280/6.151 |
| 7,226,057 B2 * | 6/2007 | Eichhorn | B60S 9/12 | 280/6.154 |
| 7,534,083 B2 * | 5/2009 | Trudeau | B62D 63/061 | 414/483 |
| 7,950,675 B1 * | 5/2011 | Quenzi | B60P 1/027 | 180/209 |
| 8,016,316 B1 * | 9/2011 | Carlton | B60G 3/08 | 280/789 |
| 8,651,510 B2 | 2/2014 | Fankhauser | | |
| 10,787,200 B1 * | 9/2020 | Smith, Jr. | B62D 21/20 | |
| 2002/0180179 A1 * | 12/2002 | Krauss | B60D 1/07 | 280/460.1 |
| 2004/0247419 A1 * | 12/2004 | Hill | B60P 3/07 | 414/480 |
| 2009/0160163 A1 * | 6/2009 | Gosselin | B62D 53/068 | 280/656 |
| 2009/0322048 A1 * | 12/2009 | Glavinic | B60G 17/0165 | 701/37 |
| 2016/0311284 A1 * | 10/2016 | Osborne | B60G 5/00 | |
| 2017/0120879 A1 * | 5/2017 | Koh | B60P 1/00 | |
| 2019/0118882 A1 * | 4/2019 | Kinder | B62D 61/125 | |
| 2020/0094643 A1 * | 3/2020 | Leonard | B60G 11/27 | |
| 2020/0207171 A1 * | 7/2020 | Bosschieter | B60G 17/0165 | |
| 2021/0253181 A1 * | 8/2021 | Lippi | B62D 33/02 | |
| 2021/0276636 A1 * | 9/2021 | Griffee | B60P 1/4492 | |
| 2022/0024368 A1 * | 1/2022 | Smith | B60G 3/225 | |
| 2022/0185055 A1 * | 6/2022 | Charmeau | B60G 17/052 | |
| 2022/0250529 A1 * | 8/2022 | Martin | B60P 3/08 | |
| 2025/0074130 A1 * | 3/2025 | Walters | B60G 17/017 | |
| 2025/0108868 A1 * | 4/2025 | Vander Pol | B62D 21/20 | |

FOREIGN PATENT DOCUMENTS

| | | |
|---|---|---|
| CN | 216467769 | 5/2022 |
| WO | 2017037683 A1 | 3/2017 |

OTHER PUBLICATIONS

Miska Trailer Factory, Low Bed Floats 7 Ton Drop Deck, https://www.miskatrailers.com/open-steel-trailers/low-bed-floats/7-ton-drop-deck/t521, 2 pages, date:N/A.

* cited by examiner

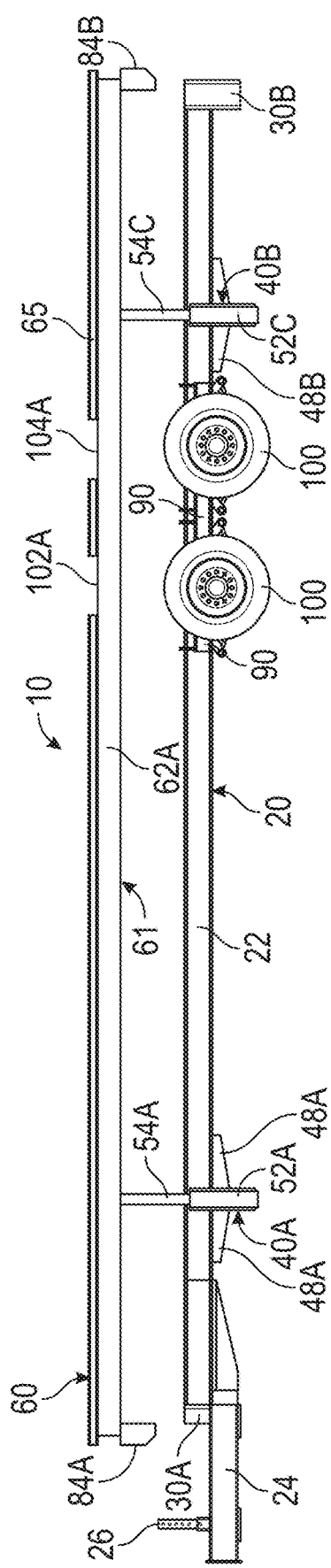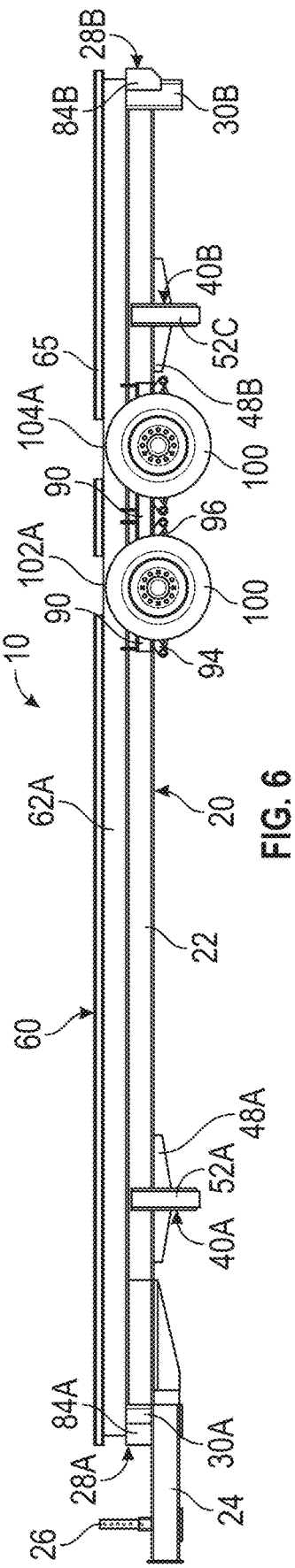
FIG. 5
FIG. 6

200
Providing a bed elevation assembly having elevation actuators quadrilaterally disposed and attached to frame members of a bed assembly and a chassis assembly 202
Actuating the elevation actuators to raise the bed assembly from a nested position to an elevated position 204
Actuating the elevation actuators to lower the bed assembly from the elevated position to the nested position 206
Moving the bed assembly through a vertical pathway of travel when raising and lowering the bed assembly between the nested and the elevated positions 208
Interlocking chassis nesting components with bed nesting components when the bed assembly is in the nested position 210
Stabilizing the bed assembly during movement from the nested position to the elevated position and when the bed assembly is held in the elevated position with the quadrilaterally disposed elevation actuators

FIG. 9

APPARATUSES AND METHODS FOR A TRAILER AND ELEVATING TRAILER BED

FIELD OF THE INVENTION

The present disclosure relates to trailers. More particularly, but not exclusively, the present disclosure relates to apparatuses and methods for a trailer and elevating trailer bed.

BACKGROUND

Freight trailers are commonly used for various tasks, typically featuring a frame rigidly attached to a chassis, with a bed fixed to the frame for transporting freight over large distances or within confined areas like yards or construction sites. Trailers designed for transporting modular units are increasingly valuable to constructors, porters, and installers in the modular unit industry. These trailer functions often meet unmet needs in other industries as well. However, existing trailers and methods for loading, unloading, and transporting modular units around plants, yards, highways, and construction sites require improvement. Current trailers lack the functionalities necessary to expedite loading and unloading, such as from modular stands, while also addressing safety concerns related to the size and weight of the cargo. The bed height of trailers is crucial in minimizing loading and unloading challenges and increasing efficiency. While some trailers are designed to adjust bed height for these purposes, there is room for improvement. Enhancing security and stability during loading, transit, and unloading—especially for trailers that elevate the bed for these tasks—is key to reducing risks, improving safety, and boosting efficiency. Therefore, there is a need for new trailer designs and methods that improve the loading, transport, and unloading of modular units and other freight with similar challenges.

SUMMARY

Therefore, it is a primary object feature, or advantage of the present disclosure to improve over the state of the art.

It is a further object, feature, or advantage of the present disclosure to provide apparatuses and methods for a trailer and elevating trailer bed.

It is a still further object, feature, or advantage of the present disclosure to provide quadrilaterally disposed elevation actuators for supporting an elevating trailer bed and cargo during loading, transit, and unloading.

Another object, feature, or advantage is to provide apparatuses and methods for a trailer and elevating trailer bed that enhances operational safety, load security, and work efficiency, particularly for voluminous, heavy loads with a higher center of gravity.

Yet another object, feature, or advantage is to provide apparatuses and methods for a trailer and elevating trailer bed that simplifies the loading and unloading of modular units onto and from modular stands, enhancing efficiency and minimizing manual effort and operational time.

In at least one exemplary aspect of the present disclosure, a trailer with elevating bed is disclosed. The trailer includes a chassis assembly having a main frame with opposing forward and rearward ends, a towing tongue connected to the forward end of the chassis assembly, an axle mount connected to the main frame proximate the rearward end of the chassis assembly, and an axle attached at the axle mount, and wheels operably attached to opposing ends of the axle. The trailer also includes a bed assembly having a plurality of cross members attached to a pair of longitudinally extending frame members with opposing forward and rearward ends and a bed elevation assembly attached to the pair of longitudinally extending frame members of the bed assembly and to the main frame of the chassis assembly proximate the forward end and the rearward end of the main frame.

In at least one other exemplary aspect of the present disclosure, a trailer with elevating bed is disclosed. The trailer includes a bed elevation assembly having elevation actuators quadrilaterally disposed and attached to frame members of a bed assembly and a chassis assembly. The chassis assembly includes an axle mount, an axle attached at the axle mount, wheels operably attached to opposing ends of the axle, and a towing tongue for towing the trailer. The quadrilaterally disposed elevation actuators stabilize the bed assembly during movement from a nested position to an elevated position and when the bed assembly is held in the elevated position.

In yet another aspect of the present disclosure, a method for elevating a trailer bed of a trailer is disclosed. The method includes, for example, providing a bed elevation assembly having elevation actuators quadrilaterally disposed and attached to frame members of a bed assembly and a chassis assembly, wherein the chassis assembly includes an axle mount, an axle attached at the axle mount, wheels operably attached to opposing ends of the axle, and a towing tongue for towing the trailer, actuating the elevation actuators to raise the bed assembly from a nested position to an elevated position, actuating the elevation actuators to lower the bed assembly from the elevated position to the nested position, and stabilizing the bed assembly during movement from the nested position to the elevated position and when the bed assembly is held in the elevated position with the quadrilaterally disposed elevation actuators.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein.

FIG. 5 is a side elevation view of the bed assembly in an elevated position relative to the chassis assembly in accordance with an exemplary aspect of the disclosure.

FIG. 6 illustrates a side elevation view of the bed assembly in a nested position relative to the chassis assembly.

FIG. 9 illustrates a flowchart of a method of operation for the trailer.

DETAILED DESCRIPTION

Figure 1:
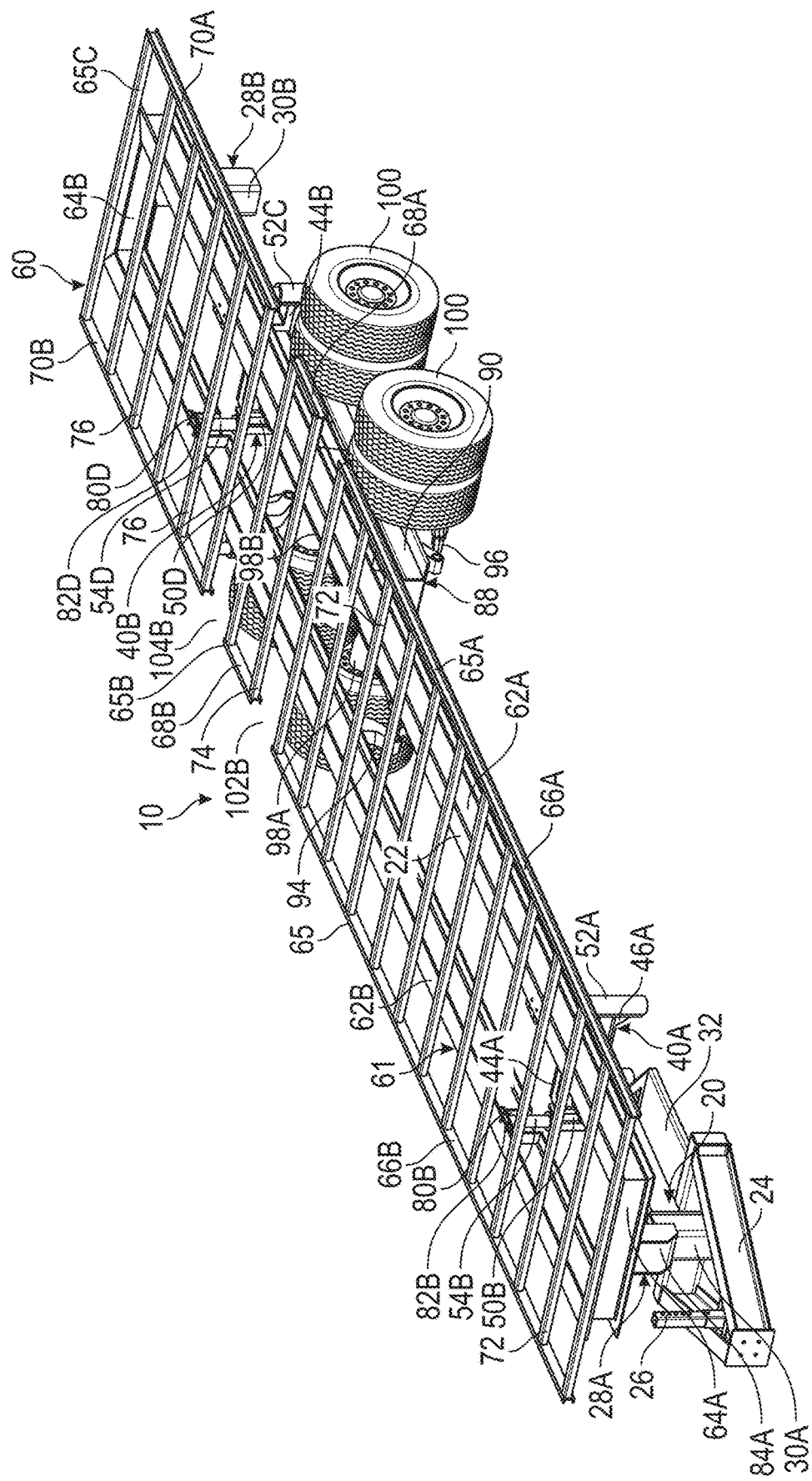
FIG. 1 is a front perspective view of a trailer in accordance with an exemplary aspect of the present disclosure.
Figure 2:
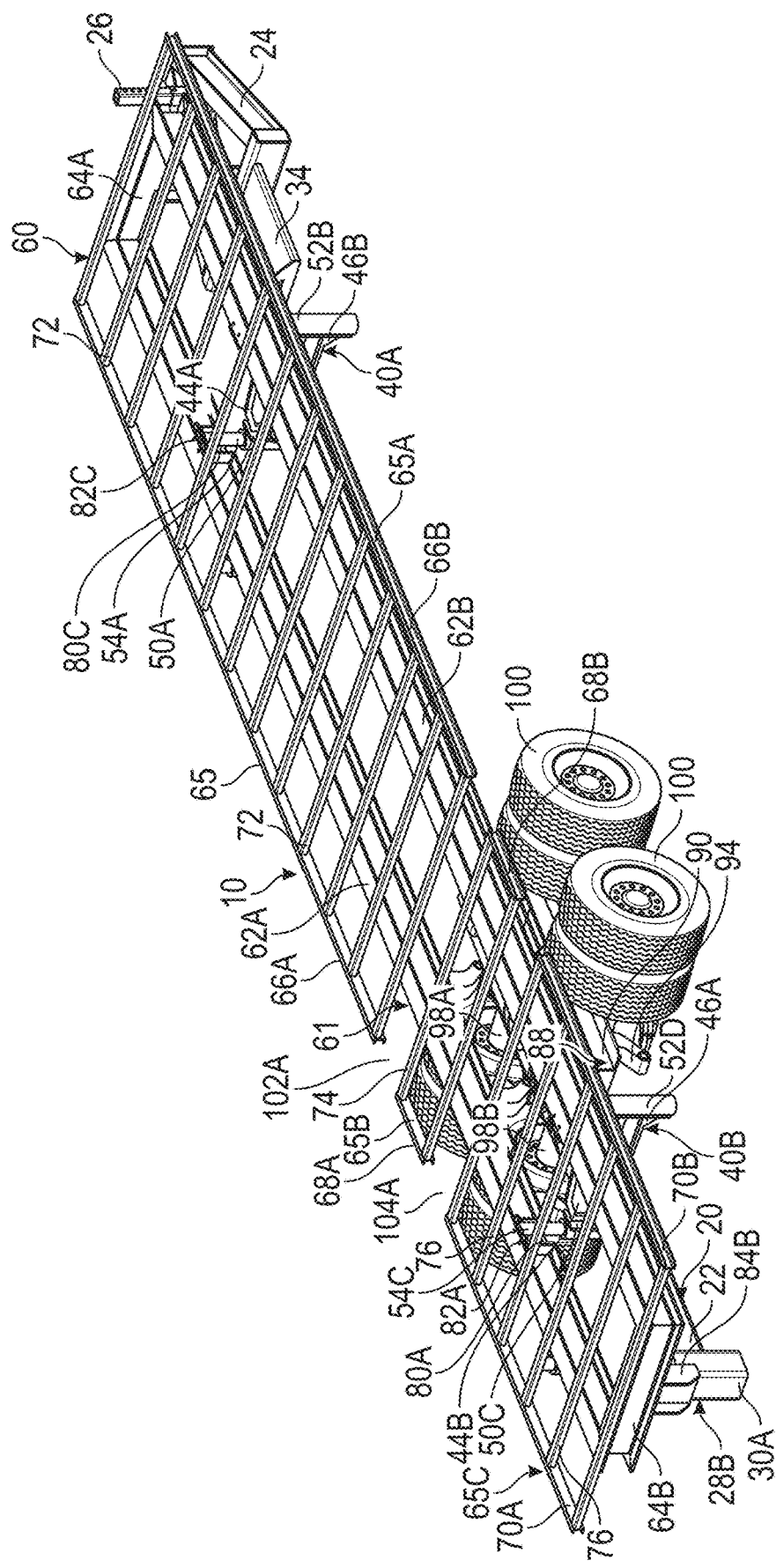
FIG. 2 is a rear perspective view of the trailer.
Figure 3:
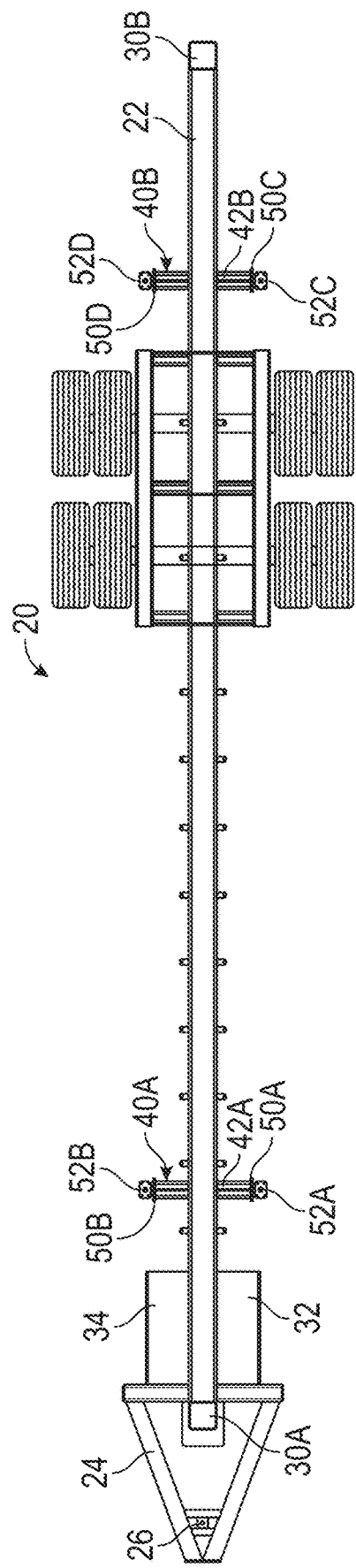
FIG. 3 is a top view of a chassis assembly of the trailer.
Figure 4:
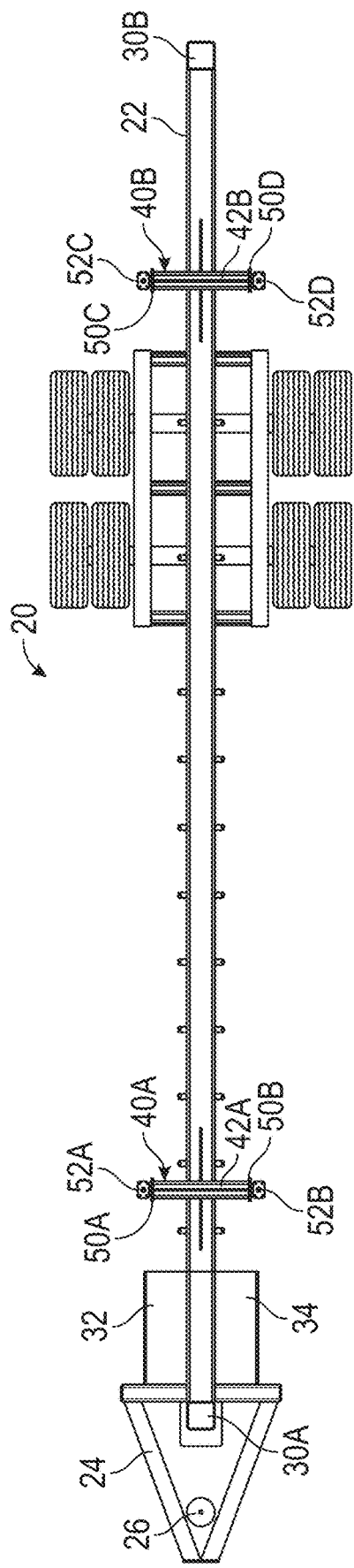
FIG. 4 is a bottom view of the chassis assembly of the trailer.

FIGS. 1-9 provide various pictorial illustrations for exemplary aspects of apparatuses and methods for a trailer and elevating trailer bed in accordance with the objects, features, and advantages of the present disclosure.

Trailer 10 includes a bed assembly 60 disposed on top of and operably mounted to a chassis assembly 20, where bed assembly 60 is moveable relative to the chassis assembly by a set of bed elevation assemblies 40A, 40B. A set of bed nesting assemblies 28A, 28B support bed assembly 60 and allow bed assembly 60 to nest immediately adjacent chassis assembly 20.

Chassis assembly 20 includes a main frame member 22 having a forward end terminating in a chassis nesting component 30A and an opposing rearward end terminating in a chassis nesting component 30B. Main frame member 22 may be an elongated beam, such as an elongated box beam. Main frame member 22 may also be configured from various other types of beams, such as an I-beam, C-beam, L-beam, Z-beam, double T-beam, and various tubing. Main frame member 22 may be configured from a single member or multiple members secured together using welds, plates and other connectors. Stowage bays 32, 34 may be attached at locations between the forward end and opposing rearward end of main frame member 22. Stowage bays 32, 34 may be configured for stowage of tarps, straps, tie-downs, ratchet straps, spare tires, tire and wheel tools, safety equipment such as cones, reflective triangles, and flares, toolboxes, chains and blocks, blocking and bracing materials, hydraulic lines, valves and other components, vehicle and hydraulic power sources such as a battery and power cables.

A towing tongue 24 is attached to the forward end of main frame member 22.

Figure 7:
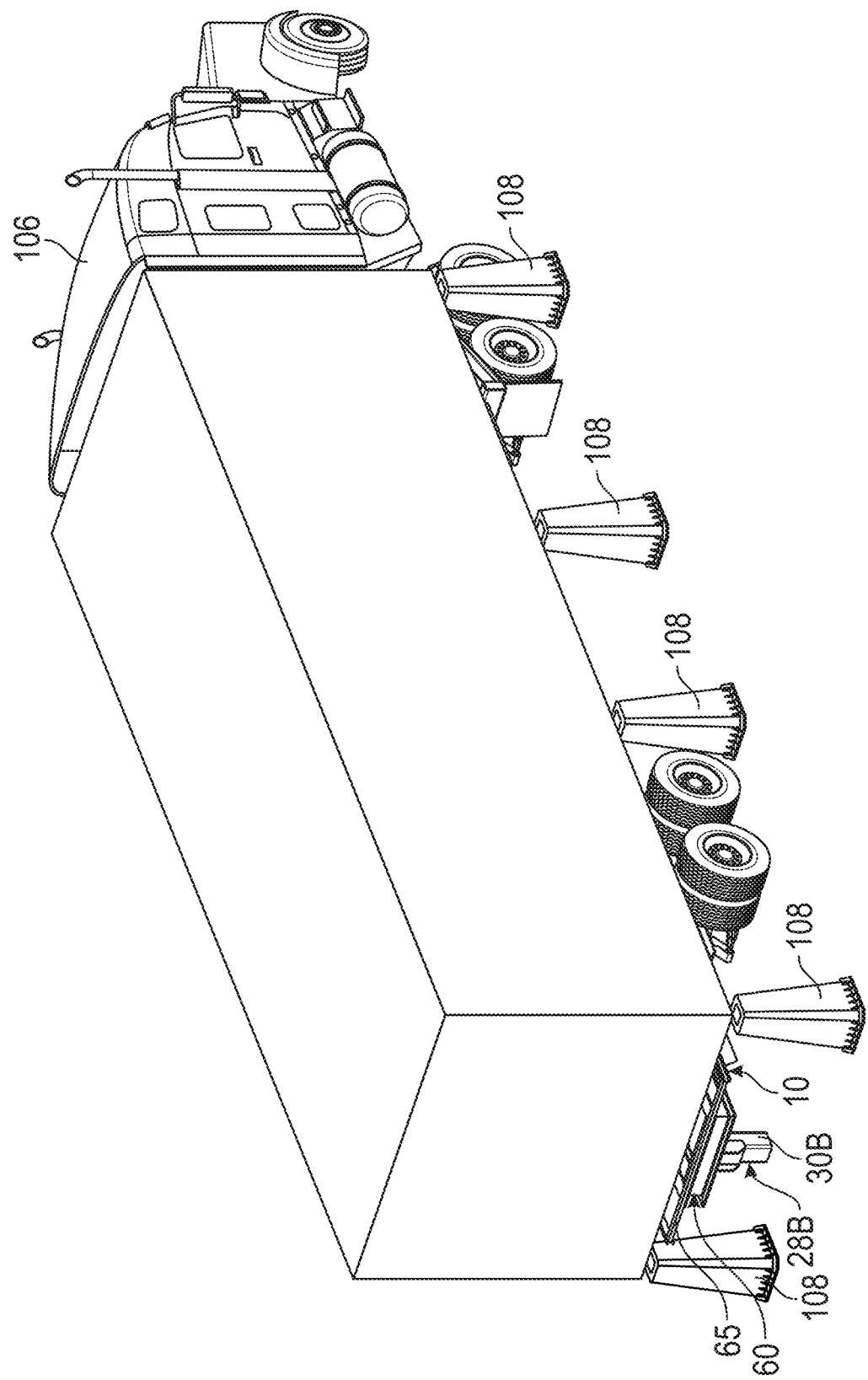
FIG. 7 illustrates a rear perspective view of the trailer, a modular unit and towing implement with the trailer in the elevated position.
Figure 8:
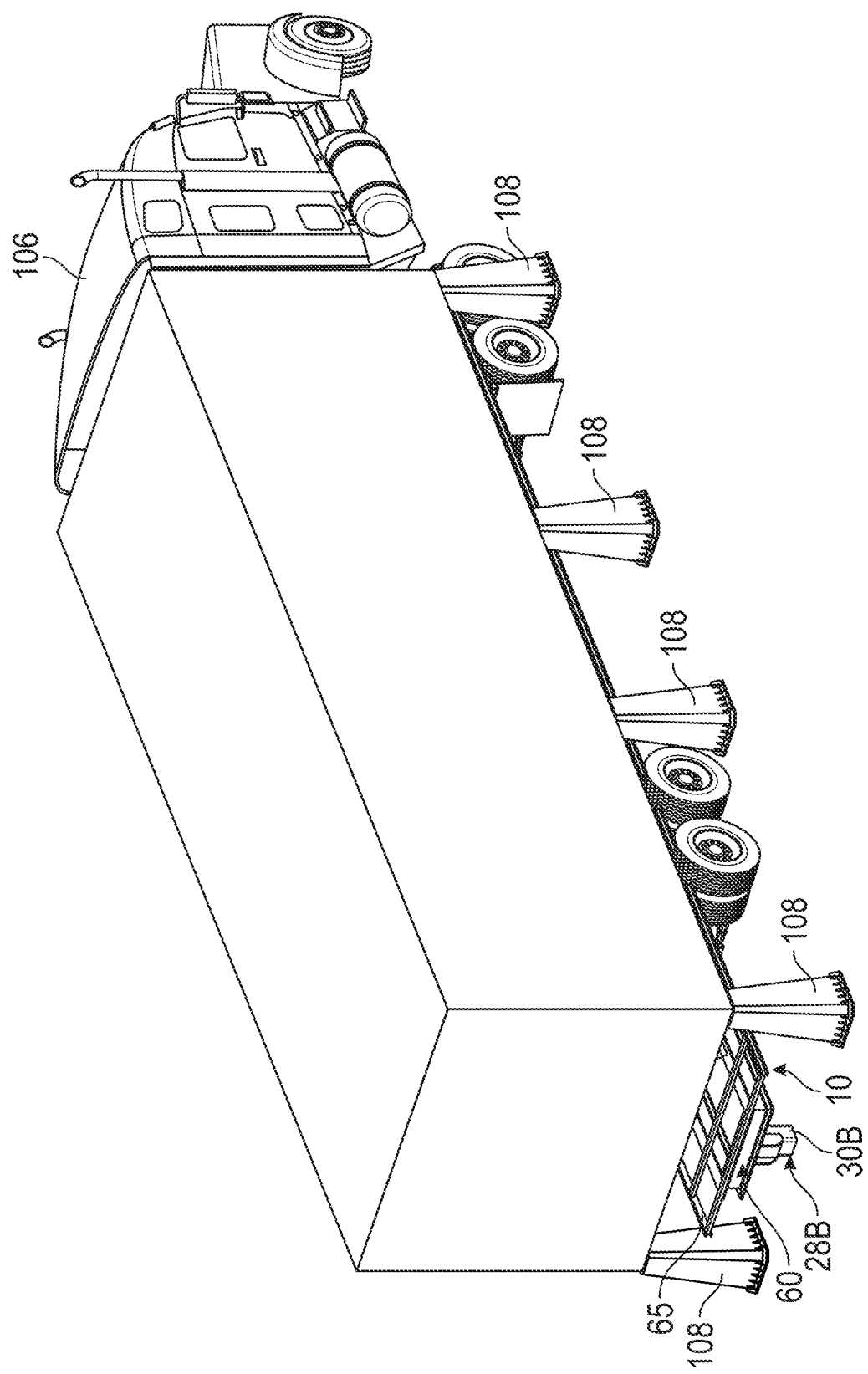
FIG. 8 illustrates a rear perspective view of the trailer, a modular unit and towing implement with the trailer in the nest position.

Towing tongue 24 includes a jack 26 for raising and lowering towing tongue 24 relative to the underlying surface when hooking and unhooking trailer 10 from a towing implement 106 (FIGS. 7-8). Jack 26 may be operated manually, electrically or pneumatically.

An axle mount assembly 88 is attached generally near the rearward end of main frame member 22. Axle mount assembly 88 includes an axle mount frame 90 attached to main frame member 22. In at least one aspect, axle mount frame 90 is attached to the underside of main frame member 22. In another aspect, axle mount frame 90 may be attached at other locations on main frame member 22 to control the relative height of the top of each wheel 100 and the top side of the main frame member 22 and bed assembly 60.

Axle mount assembly 88 may be mounted at various rearward locations to main frame member 22 depending on the number of axles 98A, 98B needed for supporting the intended hauling load of trailer 10. Axle mount assembly 88 generally includes an axle mount attaching a spring 96, such as a leaf spring, to axle 98. Spring 96 has opposing ends secured to axle mount frame 90 via a pair of sprint mounts 94. Single wheel 100 or dual wheels 100, as shown in FIG. 1, are attached to opposing ends of axle 98. In one aspect, trailer 10 may include a tag axle (not shown) for additional load carrying capacity.

A bed assembly 60 is positioned and supported atop of main frame member 22. Bed assembly 60 includes a bed frame 61 configured from a pair of longitudinally extending frame members 62A, 62B. Longitudinally extending frame members 62A, 62B include forward ends and opposing rearward ends. Longitudinally extending frame members 62A, 62B may be an elongated beam, such as an elongated I-beam. Longitudinally extending frame members 62A, 62B may also be configured from various other type of beams, such as a box beam, C-beam, L-beam, Z-beam, double T-beam, and various tubing. Longitudinally extending frame members 62A, 62B may be configured from a single member or multiple members secured together using welds, plates and other connectors. Although bed frame 61 is shown configured with a pair of longitudinally extending frame members 62A, 62B, bed frame 61 may be configured with multiple longitudinally extending frame members. Longitudinally extending frame members 62A, 62B are disposed in a spaced apart relationship. In one aspect, longitudinally extending frame members 62A, 62B are parallelly disposed relative to each other and main frame member 22 of chassis assembly 20.

Forward and rearward ends of longitudinally extending frame members 62A, 62B are connected by a pair of transverse frame members 64A, 64B of bed frame 61. For example, opposing ends of transverse frame members 64A are connected to forward ends of longitudinally extending frame members 62A, 62B and opposing ends of transverse frame member 64B are connected to rearward ends of longitudinally extending frame members 62A, 62B. Together, transverse frame members 64A, 64B and longitudinally extending frame members 62A, 62B form bed frame 61. Transverse frame members 64A, 64B may be a beam, such as an I-beam. Transverse frame members 62A, 62B may also be configured from various other type of beams, such as a box beam, C-beam, L-beam, Z-beam, double T-beam, and various tubing. Transverse frame members 64A, 64B may be configured from a single member or multiple members secured together using welds, plates and other connectors.

Bed assembly 60 also includes a bed 65 disposed on top of and connected to bed frame 61. Bed 65 includes bed sections 65A, 65B, 65C. Bed 65 may be configured from one or more bed sections. In one aspect, bed 65 may be configured from a single bed section or multiple bed sections. Bed sections 65A, 65B, 65C lie in the same horizontal plane, thus bed 65 is planar and provides a planar, horizontal load bearing surface. Bed section 65A is disposed generally on middle to forward portions of bed frame 61 and includes a pair of longitudinally extending frame members 66A, 66B disposed in a parallel arrangement and connected by cross members 72. Bed section 65B is disposed generally on middle to rearward portions of bed frame 61 and includes a pair of longitudinally extending frame members 68A, 68B disposed in a parallel arrangement and connected by cross members 74. Bed section 65C is disposed generally on rearward portions of bed frame 61 and includes a pair of longitudinally extending frame members 70A, 70B disposed in a parallel arrangement and connected by cross members 76. Adjacent ends of bed sections 65A and 65B are separated generally by the diameter of wheel 100 on first axle 98A for forming opposing wheel well carveouts 102A, 102B. Similarly, adjacent ends of bed sections 65B and 65C are separated generally by the diameter of wheel 100 on second axle 98B for forming opposing wheel well carveouts 104A, 104B. Longitudinally extending frame members 66A, 66B, 68A, 68B, 70A, 70B and cross members 72, 74, 76 may be elongated beams, such as elongated U-beams and box beams. Longitudinally extending frame members 66A, 66B, 68A, 68B, 70A, 70B and cross members 72, 74, 76 may also be configured from various other types of beams, such as an I-beam, C-beam, L-beam, Z-beam, double T-beam, and various tubing. Longitudinally extending frame members 66A, 66B, 68A, 68B, 70A, 70B and cross members 72, 74, 76 may be configured from a single member or multiple members secured together using welds, plates and other connectors. Longitudinally extending frame members 66A, 66B, 68A, 68B, 70A, 70B are disposed on top of and connected to bed frame 61 in generally parallel arrangement with longitudinally extending frame members 62A, 62B and in generally perpendicular arrangement with transverse frame members 64A, 64B. Cross members 72, 74, 76 are disposed on top of and connected to bed frame 61 in generally parallel arrangement with transverse frame members 64A, 64B and perpendicular arrangement with longitudinally extending frame members 62A, 62B.

Trailer 10 includes quadrilaterally disposed bed elevation assemblies 40A, 40B (Step 200). In one aspect, bed elevation assembly 40A is disposed forward of the middle portion of main frame member 22 and bed elevation assembly 40B is disposed rearward of the middle portion of main frame member 22. Bed elevation assemblies 40A, 40B include respective cross members 42A, 42B connected to main frame member 22 of chassis assembly 20. In one aspect, cross members 42A, 42B are connected to the underside of and arranged perpendicular to main frame member 22. Cross members 42A, 42B may be connected at other locations and angles relative to main frame member 22. One or more braces 44A, 48A may be connected to cross member 42A and main frame member 22 and one or more braces 44B, 48B may be connected to cross member 42B and main frame member 22. Cross members 42A, 42B may be an elongated beam, such as an elongated box beam. Cross members 42A, 42B may also be configured from various other type of beams, such as an I-beam, C-beam, L-beam, Z-beam, double T-beam, and various tubing. Cross members 42A, 42B may be configured from a single member or multiple members secured together using welds, plates and other connectors. Cross member 42A includes opposing ends terminating in mounting plates 50A, 50B. Similarly, cross member 42B includes opposing ends terminating in mounting plates 50C, 50D. One or more braces 46A may be connected to cross member 42A and mounting plates 50A, 50B and one or more braces 44B may be connected to cross member 42B and mounting plates 50C, 50D.

Bed elevation assembly 40A includes elevation actuator 52A connected to mounting plate 50A and elevation actuator 52B connected to mounting plate 50B. Similarly, bed elevation assembly 40B includes elevation actuator 52C connected to mounting plate 50C and elevation actuator 52D connected to mounting plate 50D. Bed elevation actuators include vertically extending and retracting elevation arms 54A-54D. In at least one aspect, elevation actuators 52A-52D are connected to mounting plates 50A-50D so elevation actuators 52A-52D are vertically disposed and positioned at a height to allow bed assembly 60 to be positioned immediately adjacent chassis assembly 20 when elevation arms 54A-54D are retracted. Elevation arms 54A-54D may be electrically, pneumatically, hydraulically, or mechanically actuated. Electricity, compressed air, and pressurized hydraulic fluid may be supplied to elevation actuators 52A-52D from an electrical source such as a battery or generator (not shown), air compressor (not shown), or hydraulic pump (not shown) disposed in one of the stowage bays 32, 34 or on the towing implement 106 shown in FIGS. 7-8. Mechanical input from a user or operator of trailer 10 may also provide a mechanical input to mechanically actuate elevation actuators 52A-52D.

Mounting recesses 80A-80D are disposed in a quadrilateral arrangement in longitudinally extending frame members 62A, 62B of bed assembly 60 and in vertical alignment with elevation arms 54A-54D of bed elevations assemblies 40A, 40B also disposed and attach in a quadrilateral arrangement to main frame member 22 of chassis assembly 20. In one aspect, mounting recesses 80A-80D are each configured as a notched-out cavity or recess formed in longitudinally extending frame members 62A, 62B. Mounting plates 82A-82D are disposed in respective mounting recesses 80A-80D for attaching respective vertical most ends of elevation arms 54A-54D to respective mounting recesses 80A-80D. Mounting plates 82A-82D also distribute the force from elevation arms 54A-54D acting on longitudinally extending frame members 62A, 62B across a larger surface area of respective mounting recesses 80A-80D.

Bed assembly 60 is rigidly supported and stabilized against lateral and torsional forces during transit of trailer 10, during vertical (ascending and descending) movement of bed assembly 60, and when bed assembly 60 is held in an elevated position relative to chassis assembly 20 by the quadrilateral arrangement and connection of bed elevation assemblies 40A, 40B to bed assembly 60 and chassis assembly 20. Nesting assemblies 28A, 28B provide additional support and stability to bed assembly 60 when the bed frame 61 of bed assembly 60 is in a nested or trailering position disposed immediately adjacent main frame member 22 of chassis assembly 20. Nesting assembly 28A includes a chassis nesting component 30A disposed on the forward end of main frame member 22 of chassis assembly 20. Similarly, nesting assembly 28B includes a chassis nesting component 30B on the rearward end of main frame member 22 of chassis assembly 20. In one aspect, chassis nesting components 30A, 30B are configured as a vertically extending and oriented box beam, such as a vertically oriented and extending section of a box beam attached to opposing ends of main frame member 22. Nesting assembly 28A also includes a bed nesting component 84A disposed on transverse frame member 64A of bed frame 61. Similarly, nesting assembly 28B also includes a bed nesting component 84B disposed on transverse frame member 64B of bed frame 61. In one aspect, bed nesting components 84A, 84B are configured as a vertically extending U-shaped channel or H-shaped channel, such as by using a section of a U-beam or H-beam attached to and generally at a midpoint of respective transverse frame members 64A, 64B. When bed frame 61 of bed assembly 60 is positioned immediately adjacent main frame member 22 of chassis assembly 20, respective bed nesting components 84A, 84B are completely mated to and fully nested in respective chassis nesting components 30A, 30B to support and stabilize bed assembly 60. Nesting assemblies 28A, 28B also support bed assembly 60 during initial ascending vertical movement and final descending vertical movement. The vertical length and attachment height of chassis nesting components 30A, 30B relative to main frame member 22 and bed nesting components 84A, 84B relative to transverse frame members 64A, 64B may be adjusted in vertical length. For example, chassis nesting components 30A, 30B and bed nesting components 84A, 84B may be lengthened to increase the portion of travel of bed assembly being supported and stabilized by nesting assemblies 28A, 28B. Alternatively, chassis nesting components 30A, 30B and bed nesting components 84A, 84B may be shortened to decrease the portion of travel of bed assembly being supported and stabilized by nesting assemblies 28A, 28B.

Elevation arms 54A-54D and their respective elevation actuators 52A-52D may be configured with a desired vertical travel resulting in a desired ascending vertical travel of bed assembly 60 to an elevated position shown in FIG. 5 when elevation arms 54A-54D are extended and configured with a desired vertical travel resulting in a desired descending vertical travel of bed assembly 60 to a nested position shown in FIG. 6 when elevation arms 54A-54D are retracted. Travel of elevation arms 54A-54D is equal during extension and retraction for keeping bed assembly 60 parallel with chassis assembly 20. In at least one aspect, mounting recesses 80A-80D in longitudinally extending frame members 62A, 62B, travel of elevations arms 54A-54D, and the mounting position of elevation actuators 52A-52D to respective mounting plates 50A-50D are configured so bed frame 61 of bed assembly 60 is positioned immediately adjacent or in contact with main frame member 22 of chassis assembly 20. Thus, at least in one aspect, the bed assembly 60 is positioned at a height immediately above the chassis assembly 20 resulting in a preferred bed 65 height relative to the ground for loading and unloading freight.

Loading and unloading of freight from trailer 10, at least in circumstances where freight dimensions extend beyond the width of bed 65, can be accomplished by lowering bed assembly 60 until the freight sitting atop bed 65 is no longer supported by bed 65 but by one or more freight stands 108 (FIGS. 7-8) positioned on opposing lengthwise sides of trailer 10. In at least one aspect, freight such as a prefabricated modular unit can be loaded on and unloaded from trailer 10. Loading is accomplished by positioning bed assembly 60 in the nested position and backing trailer 10 under the prefabricated modular unit while the prefabricated modular unit is supported on its lengthwise outer edges by freight stands 108, such as the freight stands shown in U.S. Pat. No. 11,466,810 to ModCribs, LLC. Once trailer 10 is positioned underneath the prefabricated modular unit, bed assembly 60 is elevated to the elevated position shown in FIG. 5 so the prefabricated modular unit is supported by bed 65 and not by freight stands 108, as shown in FIG. 7. Freight stands 108 can now be moved and bed assembly 60 lowered to the nested position shown in FIG. 6 for porting the prefabricated modular unit. Conversely, unloading of a prefabricated modular unit is accomplished by raising bed assembly 60 to the elevated position, as shown in FIG. 7, at least higher than the height of the freight stands 108, placing freight stands 108 underneath the lengthwise outer edges of the prefabricated modular unit, and lowering bed assembly 60 to the nested position shown in FIG. 6 until the prefabricated modular unit is supported by the freight stands 108, as shown in FIG. 8, and not by bed assembly 60. Trailer 10 can now be moved out from under the prefabricated modular unit. Trailer 10 is configured, in at least one aspect, so bed 65 height, relative to the ground, when bed assembly 60 is in the nested position is preferably at 32 inches above ground or can be generally between 32-35 inches or lower to allow for transfer of a prefabricated modular unit onto and off of 36-inch-tall freight stands, such as the freight stands shown in U.S. Pat. No. 11,466,810 to Modcribs, LLC. Trailer 10 can accommodate loading on and unloading from differing heights of freight stands 108 with bed assembly 60 being adjustable in height between the elevated and nesting positions shown in FIGS. 5-6. Although, examples of use of trailer 10 for loading and unloading prefabricated modular units is disclosed, the present disclosure contemplates the loading and unloading of suitable types of freight by moving bed assembly 60 between its elevated and nested position. Additionally, freight clearance heights are reduced when bed assembly 60 is in the nested position, which also lowers the center of gravity of heavy, awkward or unbalanced loads to increase the safety of during porting freight, whether in a freight yard or on a highway.

The present disclosure provides methods for trailer 10 and elevating trailer bed 65 as also discussed above. The method includes, for example, providing bed elevation assemblies 40A, 40B having elevation actuators 52A-52D quadrilaterally disposed and attached to longitudinally extending frame members 62A, 62B of bed assembly 60 and chassis assembly 20 (Step 200), wherein chassis assembly 20 includes at least an axle mount assembly 88, an axle 98 attached to main frame 22 of chassis assembly 20 with axle mount 92, wheels 100 operably attached to opposing ends of axle 98, and towing tongue 24 for towing trailer 10. Methods of the disclosure also includes steps, such as, actuating elevation actuators 52A-52D to raise bed assembly 60 from the nested position shown in FIG. 5 to the elevated position (Step 202) shown in FIG. 6, actuating elevation actuators 52A-52D to lower bed assembly 60 from the elevated position to the nested position (Step 204), moving bed assembly 60 through a vertical pathway of travel when raising and lowering bed assembly 60 between the nested and the elevated positions (Step 206), interlocking (i.e., fully nesting and completely mating nesting assemblies 28A, 28B) chassis nesting components 30A, 30B disposed on a forward end and a reward end of main frame member 22 of chassis assembly 20 with bed nesting components 84A, 84B disposed on a forward end and a reward end of bed frame 61 of bed assembly 60 in the nested position (Step 208), and stabilizing bed assembly 60 during movement from the nested position to the elevated position and when bed assembly 60 is held in the elevated position with the quadrilaterally disposed elevation actuators 52A-52D (Step 210).

The disclosure is not to be limited to the particular aspects described herein. In particular, the disclosure contemplates numerous variations in apparatuses and methods for an elevating trailer bed. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes or methods of the disclosure. It is understood that any other modifications, substitutions, and/or additions can be made, which are within the intended spirit and scope of the disclosure.

What is claimed is:

1. A trailer with elevating bed, comprising:
   a chassis assembly having a main frame with opposing forward and rearward ends, a towing tongue connected to the forward end of the chassis assembly, an axle mount connected to the main frame proximate the rearward end of the chassis assembly, an axle attached at the axle mount, and wheels operably attached to opposing ends of the axle;
   a unitary bed assembly having a plurality of cross members attached to a pair of longitudinally extending frame members extending continuously between opposing forward and rearward ends;
   a bed elevation assembly attached to the pair of longitudinally extending frame members of the unitary bed assembly and to the main frame of the chassis assembly proximate the forward end and the rearward end of the main frame.

2. The trailer of claim 1, wherein the bed elevation assembly comprises a mounting frame having a cross member attached to the main frame and an elevation actuator mounting point disposed on opposing sides of the cross member.

3. The trailer of claim 1, wherein the bed elevation assembly comprises a pair of elevation actuators operably attached to the pair of longitudinally extending frame members of the bed assembly and to the main frame of the chassis assembly.

4. The trailer of claim 1, wherein the bed elevation assembly comprises elevation actuators quadrilaterally disposed and attached to the pair of longitudinally extending frame members of the bed assembly and to the main frame of the chassis assembly.

5. The trailer of claim 1, further comprising:
a nesting assembly with a chassis nesting component disposed on the forward end and the rearward end of the main frame and a bed nesting component disposed on opposing transverse frame members connected between the pair of longitudinally extending frame members.

6. The trailer of claim 1, further comprising:
a bed nesting assembly configured to secure and stabilize the bed assembly to the chassis assembly when the bed assembly is in a nested position immediately adjacent the chassis assembly.

7. The trailer of claim 1, wherein the bed assembly comprises a bed having a planar surface and opposing wheel carveouts disposed in the planar surface for accommodating the wheels with the bed assembly in a nested position immediately adjacent the chassis assembly.

8. The trailer of claim 1, wherein the bed elevation assembly comprises a mounting frame having a cross member attached to the main frame, elevation actuator mounting points disposed on opposing sides of the cross member, and an elevation actuator having opposing mounting points, wherein a first one of the opposing mounting points is attached to the elevation actuator mounting point and a second one of the opposing mounting points is attached to the bed assembly, wherein the bed elevation assembly stabilizes the bed during movement from a nested position to an elevated position and when the bed is held in the elevated position.

9. A trailer with elevating bed, comprising:
a bed elevation assembly having elevation actuators quadrilaterally disposed and attached to frame members of a unitary bed assembly and a chassis assembly, wherein the unitary bed assembly extends continuously between opposing forward and rearward ends of the chassis assembly and the chassis assembly includes an axle mount, an axle attached at the axle mount, wheels operably attached to opposing ends of the axle, and a towing tongue for towing the trailer, wherein the quadrilaterally disposed elevation actuators stabilize the bed assembly during movement along a vertical path from a nested position to an elevated position and when the bed assembly is held in the elevated position.

10. The trailer of claim 9, wherein the bed assembly includes a plurality of cross members attached to a pair of longitudinally extending frame members with opposing forward and rearward ends, wherein the elevation actuators are secured to the pair of longitudinally extending frame members.

11. The trailer of claim 9, wherein the chassis assembly includes a main frame with opposing forward and rearward ends, wherein the elevator actuators are secured to the main frame.

12. The trailer of claim 9, further comprising:
a bed nesting assembly with a chassis assembly component disposed on a forward end and a rearward end of the chassis assembly and a bed assembly component disposed on a forward end and a rearward end of the bed assembly.

13. The trailer of claim 9, wherein the bed assembly comprises a bed having a planar surface and opposing wheel carveouts disposed in the planar surface for accommodating the wheels with the bed assembly in a nested position immediately adjacent the chassis assembly.

14. A method for elevating a trailer bed of a trailer, comprising:
providing a bed elevation assembly having elevation actuators quadrilaterally disposed and attached to frame members of a unitary bed assembly and a chassis assembly, wherein the unitary bed assembly extends continuously between opposing forward and rearward ends of the chassis assembly and the chassis assembly includes an axle mount, an axle attached at the axle mount, wheels operably attached to opposing ends of the axle, and a towing tongue for towing the trailer;
actuating the elevation actuators to raise the bed assembly from a nested position to an elevated position;
actuating the elevation actuators to lower the bed assembly from the elevated position to the nested position; and
stabilizing the bed assembly during movement from the nested position to the elevated position and when the bed assembly is held in the elevated position with the quadrilaterally disposed elevation actuators.

15. The method of claim 14, further comprising:
interlocking a chassis assembly component disposed on a forward end and a rearward end of the chassis assembly with a bed assembly component disposed on a forward end and a rearward end of the bed assembly in the nested position.

16. The method of claim 14, further comprising:
moving the bed assembly through a vertical pathway of travel when raising and lowering the bed assembly between the nested and the elevated positions.

17. The method of claim 14, wherein the bed elevation assembly comprises a mounting frame having a cross member attached to an underside of one of the frame members of the chassis assembly, an elevation actuator mounting point disposed on opposing sides of the cross member, and one of the elevation actuators attached at each elevation actuator mounting point.

18. The method of claim 14, wherein the bed assembly comprises a bed having a planar surface and opposing wheel carveouts disposed in the planar surface for accommodating the wheels when the bed assembly is in the nested position immediately adjacent the chassis assembly.

19. The method of claim 14, wherein the frame members of the chassis assembly include a main frame with opposing forward and rearward ends and the frame members of the bed assembly include a plurality of cross members attached to a pair of longitudinally extending frame members with opposing forward and rearward ends, wherein the elevation actuators are secured to the pair of longitudinally extending frame members.

20. The method of claim 14, wherein the elevation actuators are disposed between a main frame of the chassis assembly and a pair of longitudinally extending, parallelly disposed frame members of the bed assembly.

* * * * *